(12) United States Patent
Ishige et al.

(10) Patent No.: US 12,358,132 B2
(45) Date of Patent: Jul. 15, 2025

(54) ROBOT SYSTEM AND PICKING METHOD

(71) Applicants: OMRON Corporation, Kyoto (JP); The University of Tokyo, Tokyo (JP)

(72) Inventors: Matthew Ishige, Tokyo (JP); Takuya Umedachi, Tokyo (JP); Yoshihisa Ijiri, Kyoto (JP)

(73) Assignees: OMRON Corporation, Kyoto (JP); The University of Tokyo, Tokyo (JP)

( * ) Notice: Subject to any disclaimer, the term of this patent is extended or adjusted under 35 U.S.C. 154(b) by 181 days.

(21) Appl. No.: 18/021,268

(22) PCT Filed: Aug. 17, 2021

(86) PCT No.: PCT/JP2021/030017
§ 371 (c)(1),
(2) Date: Feb. 14, 2023

(87) PCT Pub. No.: WO2022/054505
PCT Pub. Date: Mar. 17, 2022

(65) Prior Publication Data
US 2023/0294278 A1    Sep. 21, 2023

(30) Foreign Application Priority Data
Sep. 9, 2020    (JP) ................ 2020-151539

(51) Int. Cl.
*B25J 9/16*    (2006.01)
*B25J 13/08*    (2006.01)
(52) U.S. Cl.
CPC ........... *B25J 9/1612* (2013.01); *B25J 9/1697* (2013.01); *B25J 13/081* (2013.01)

(58) Field of Classification Search
None
See application file for complete search history.

(56) References Cited

U.S. PATENT DOCUMENTS

| 2012/0059517 A1 | 3/2012 | Nomura |
| 2012/0158180 A1 | 6/2012 | Io et al. |

(Continued)

FOREIGN PATENT DOCUMENTS

| CN | 102729253 A | 10/2012 |
| CN | 107530887 A | 1/2018 |

(Continued)

OTHER PUBLICATIONS

Office Action dated Apr. 23, 2024, issued in corresponding Japanese Patent Application No. 2020-151539.

(Continued)

*Primary Examiner* — Ryan Rink
(74) *Attorney, Agent, or Firm* — Morgan, Lewis & Bockius LLP

(57) ABSTRACT

Provided is a robot system comprising: a robot mechanism provided with fingers for grasping a workpiece; a detection unit that detects a grasping state of the workpiece by the fingers; a recognition unit that recognizes the number of workpieces being grasped by the fingers on the basis of a detection result from the detection unit; and a control unit that, after causing the robot mechanism to perform a motion of grasping the workpieces from a placing area where a plurality of workpieces are placed, if the number of the workpieces recognized by the recognition unit is different from a specified number specified in advance, controls the motion of the robot mechanism such that the number of the grasped workpieces is equal to the specified number.

14 Claims, 10 Drawing Sheets

(56) References Cited

U.S. PATENT DOCUMENTS

| | | |
|---|---|---|
| 2012/0265345 A1 | 10/2012 | Nakahara |
| 2013/0154294 A1* | 6/2013 | Shiomi ............... B25J 11/0045 294/213 |
| 2016/0075031 A1 | 3/2016 | Gotou |
| 2017/0057092 A1 | 3/2017 | Ito |
| 2017/0203443 A1 | 7/2017 | Lessing et al. |
| 2018/0117773 A1 | 5/2018 | Odhner et al. |
| 2019/0145455 A1 | 5/2019 | Curhan et al. |
| 2020/0206913 A1 | 7/2020 | Kaehler |
| 2024/0017426 A1* | 1/2024 | Sun ....................... B25J 9/1664 |
| 2024/0100695 A1* | 3/2024 | Matsuda .................. B25J 15/08 |

FOREIGN PATENT DOCUMENTS

| | | |
|---|---|---|
| EP | 3453493 A2 | 3/2019 |
| JP | 2008-087105 A | 4/2008 |
| JP | 2012-055999 A | 3/2012 |
| JP | 2012-115972 A | 6/2012 |
| JP | 2013-086186 A | 5/2013 |
| JP | 5196156 B2 | 5/2013 |
| JP | 5767464 B2 | 8/2015 |
| JP | 2016-059983 A | 4/2016 |
| JP | 2017-042859 A | 3/2017 |
| JP | 2018-507116 A | 3/2018 |
| JP | 2019-503278 A | 2/2019 |
| JP | 2019-089145 A | 6/2019 |
| JP | 6671694 B1 | 3/2020 |
| JP | 2020-082322 A | 6/2020 |
| WO | 2019/065426 A1 | 4/2019 |
| WO | 2019/094937 A1 | 5/2019 |

OTHER PUBLICATIONS

Extended European Search Report dated Sep. 6, 2024, issued in corresponding European Patent Application No. 21866465.4.
International Search Report issued in corresponding International Application No. PCT/JP2021/030017 dated Oct. 26, 2021.
Written Opinion issued in corresponding International Patent Application No. PCT/JP2021/030017 dated Oct. 26, 2021.
Office Action issued in corresponding Chinese Patent Application No. 202180050579.0, dated Dec. 30, 2024.

* cited by examiner

ROBOT SYSTEM AND PICKING METHOD

TECHNICAL FIELD

The present disclosure relates to a robot system and a picking method.

BACKGROUND ART

Patent Documents 1 through 3 disclose techniques of recognizing workpieces that can be picked on the basis of a captured image of workpieces that are piled-up, and picking a workpiece.
 Patent Document 1: Japanese Patent No. 5767464
 Patent Document 2: Japanese Patent Application Laid-Open (JP-A) No. 2017-42859
 Patent Document 3: Japanese Patent No. 5196156

SUMMARY OF INVENTION

Technical Problem

However, in the above-described conventional art, particularly in the cases of workpieces that are small such as screws and the like, or metal workpieces or glossy workpieces, it is difficult for an image sensor or a depth sensor to reliably detect the positions and postures of the workpieces, and, as a result, it is difficult to reliably carry out picking of a single workpiece. Further, failures in estimating clearances with interfering articles at the periphery and in computing the possibility of grasping also lead to failures in picking. Moreover, because it is often the case that the picking of a single workpiece results in the positions of the surrounding workpieces changing, time is needed in order to detect the position and posture of a workpiece before the picking operation each time.

The present disclosure was made in view of the above-described points, and an object thereof is to provide a robot system and a picking method that can pick a workpiece with high reliability even if the position and the posture of the workpiece are not detected in advance each time.

Solution to Problem

A first aspect of the present disclosure is a robot system comprising: a robot mechanism having a plurality of fingers that grasp a workpiece; a detecting section detecting a grasped state of the workpiece by the plurality of fingers; a recognition section recognizing a number of workpieces grasped by the plurality of fingers, on the basis of detection results of the detecting section; and a control section that, after having the robot mechanism perform an operation of grasping the workpiece from a placement place in which a plurality of the workpieces are placed, in a case in which the number of the workpieces recognized by the recognition section differs from a designated number that is designated in advance, controls movement of the robot mechanism such that the number of the workpieces that are grasped becomes the designated number, wherein at least one of the plurality of fingers is flexible, and in a state in which the workpiece is grasped by the plurality of fingers, the control section controls movement of the robot mechanism such that a position of at least one finger changes.

In the above-described first aspect, at least one of the plurality of fingers may be structured by an elastic member.

A second aspect of the present disclosure comprises: a robot mechanism having a plurality of fingers that grasp a workpiece; a detecting section detecting a grasped state of the workpiece by the plurality of fingers; a recognition section recognizing a number of workpieces grasped by the plurality of fingers, on the basis of detection results of the detecting section; and a control section that, after having the robot mechanism perform an operation of grasping the workpiece from a placement place in which a plurality of the workpieces are placed, in a case in which the number of the workpieces recognized by the recognition section differs from a designated number that is designated in advance, controls movement of the robot mechanism such that the number of the workpieces that are grasped becomes the designated number, wherein the detecting section includes a pressure distribution sensor provided at a grasping surface of at least one finger and detecting a pressure distribution of the grasping surface that the workpiece contacts, the recognition section recognizes the number of the workpieces by a grasped number recognition model that is learned by using, as an input, the pressure distribution detected by the detecting section, and, as an output, the number of the workpieces grasped by the plurality of fingers, and the control section controls movement of the robot mechanism on the basis of a driving method outputted from a driving method model that is learned by using, as inputs, the pressure distribution and a driving state of a driving section that drives the plurality of fingers, and, as outputs, the number of the workpieces grasped by the plurality of fingers and the driving method of the driving section for making the number of the workpieces be the designated number.

In the above-described second aspect, there may be a structure in which an elastic member is provided on the pressure distribution sensor.

In the above-described first aspect, the control section may control movement of the robot mechanism so as to, in a state in which the workpiece is grasped by the plurality of fingers, repeat moving of at least one of the plurality of fingers in at least one direction among a first direction that is a direction of movement for grasping, a second direction that intersects the first direction and a longitudinal direction of the finger, a third direction that is the longitudinal direction of the finger, and a rotation direction of rotating with the third direction being the rotation axis, until the number of the workpieces recognized by the recognition section becomes the designated number.

In the above-described first aspect, the detecting section may detect the grasped state plural times in states in which relative positional relationships between the plurality of fingers differ from one another, and the recognition section may recognize the number of the workpieces on the basis of results of detection of the grasped state of the plural times.

A third aspect of the present disclosure is a picking method comprising: detecting a grasped state of a workpiece by a plurality of fingers of a robot mechanism that has the plurality of fingers that grasp a workpiece; recognizing a number of workpieces grasped by the plurality of fingers, on the basis of detection results of the grasped state of the workpiece; and, after having the robot mechanism perform an operation of grasping the workpiece from a placement place in which a plurality of the workpieces are placed, in a case in which the recognized number of the workpieces differs from a designated number that is designated in advance, controlling movement of the robot mechanism such that the number of the workpieces that are grasped becomes the designated number, wherein at least one of the plurality of fingers is flexible, and in a state in which the workpiece is grasped by the plurality of fingers, movement of the robot mechanism is controlled such that a position of at least one finger changes.

A fourth aspect of the present disclosure is a picking method comprising: detecting a grasped state of a workpiece by a plurality of fingers of a robot mechanism that has the plurality of fingers that grasp a workpiece; recognizing a number of workpieces grasped by the plurality of fingers, on the basis of detection results of the grasped state of the workpiece; and, after having the robot mechanism perform an operation of grasping the workpiece from a placement place in which a plurality of the workpieces are placed, in a case in which the recognized number of the workpieces differs from a designated number that is designated in advance, controlling movement of the robot mechanism such that the number of the workpieces that are grasped becomes the designated number, wherein a pressure distribution sensor, which is provided at a grasping surface of at least one finger and detects a pressure distribution of the grasping surface that the workpiece contacts, is included, the number of the workpieces is recognized by a grasped number recognition model that is learned by using, as an input, the detected pressure distribution, and, as an output, the number of the workpieces grasped by the plurality of fingers, and movement of the robot mechanism is controlled on the basis of a driving method outputted from a driving method model that is learned by using, as an input, the pressure distribution, and, as outputs, the number of the workpieces grasped by the plurality of fingers and the driving method of at least one finger of the plurality of fingers which driving method is for making the number of the workpieces be the designated number.

Advantageous Effects of Invention

In accordance with the present disclosure, a workpiece can be picked with high reliability even if the position and the posture of the workpiece are not detected in advance each time.

DESCRIPTION OF EMBODIMENTS

Figure 1:
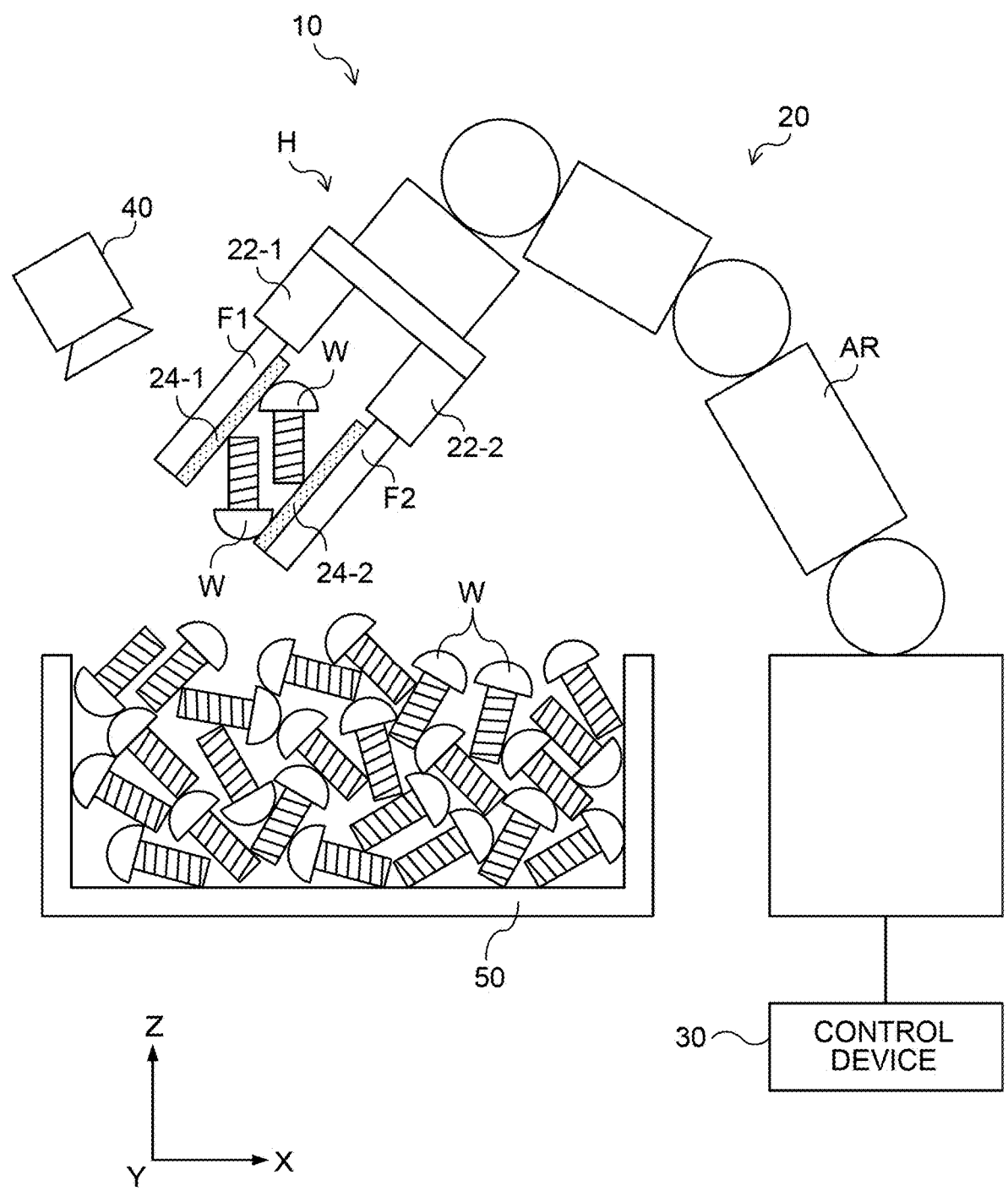
FIG. 1 is a structural drawing of a robot system.

Examples of embodiments of the present disclosure are described hereinafter with reference to the drawings. Note that, in the respective drawings, structural elements and portions that are the same or equivalent are denoted by the same reference numerals. Further, there are cases in which the dimensional proportions in the drawings are exaggerated for convenience of explanation, and cases in which they differ from actual proportions.

First Embodiment

FIG. 1 is a structural drawing of a robot system 10 relating to a first embodiment. As illustrated in FIG. 1, the robot system 10 has a robot mechanism 20, a control device 30 and an imaging section 40. In the present embodiment, the robot system 10 functions as a picking device that picks a workpiece W.

The robot mechanism 20 includes a robot arm AR serving as a mechanism portion that is the object of movement control at the time when a picking operation is carried out, and a robot hand H mounted to the distal end of the robot arm AR. The robot hand H grasps the workpiece W from a box 50 that serves as a placement place and in which the plural workpieces W are placed. The robot hand H is an example of the grasping portion. Note that, in the present embodiment, description is given of a case in which the workpieces W are parts that are relatively small to the extent that a plurality of the workpieces W can be grasped by the robot hand H, such as screws or the like for example. However, the workpieces W are not limited to this.

The robot hand H has plural fingers, and, in the present embodiment, has two fingers F1, F2 as an example, but the number of fingers is not limited to two. Further, although the fingers F1, F2 are structured by plate-shaped members as an example in the present embodiment, the shapes of the fingers F1, F2 are not limited to this.

Further, the robot hand H has a driving section 22-1 that drives the finger F1 such that the position of the finger F1 changes in the state in which the workpiece W is grasped by the fingers F1, F2, and a driving section 22-2 that drives the finger F2 such that the position of the finger F2 changes in the state in which the workpiece W is grasped by the fingers F1, F2. Note that, in the present embodiment, a case is described in which driving sections are provided at the both fingers F1, F2, but there may be a structure in which a driving section is provided at either of the fingers F1, F2.

Further, a pressure distribution sensor 24-1, which detects the pressure distribution of the grasping surface that the workpiece W contacts, is provided at the grasping surface of the finger F1. Similarly, a pressure distribution sensor 24-2, which detects the pressure distribution of the grasping surface that the workpiece W contacts, is provided at the grasping surface of the finger F2. Here, the pressure distribution sensors 24-1, 24-2 are examples of detecting sections that detect the grasped state of the workpiece W by the fingers F1, F2.

Note that, in the present embodiment, a case is described in which pressure distribution sensors are provided respectively at the both grasping surfaces of the fingers F1, F2, but there may be a structure in which a pressure distribution sensor is provided at the grasping surface of either finger among the fingers F1, F2.

As an example, a vertical articulated robot or a horizontal articulated robot of six degrees of freedom or the like is used as the robot mechanism 20, but the degrees of freedom and the type of the robot are not limited to these.

Figure 2:
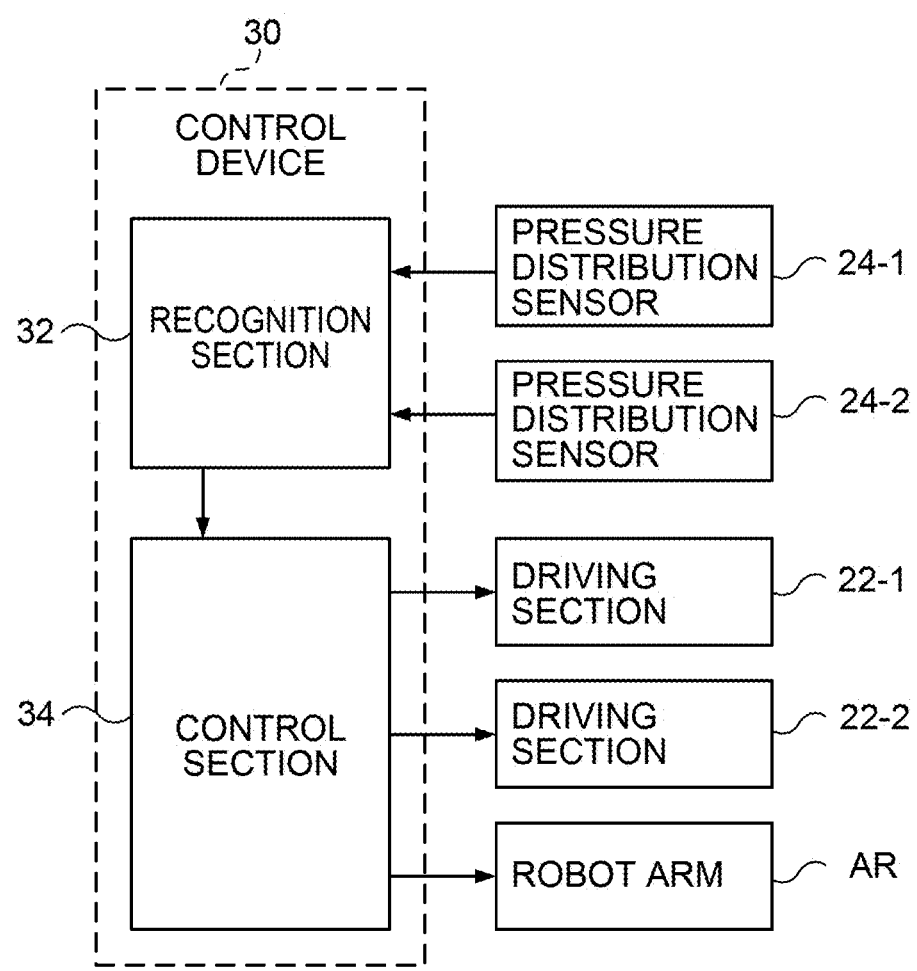
FIG. 2 is a functional block drawing of a control device.

The control device 30 controls the robot mechanism 20. As illustrated in FIG. 2, the control device 30 functionally includes a recognition section 32 and a control section 34.

The recognition section 32 recognizes the number of workpieces W that are grasped by the fingers F1, F2, on the basis of the results of detection of the pressure distribution sensors 24-1, 24-2, i.e., the pressure distributions. In the present embodiment, as an example, the recognition section 32 recognizes the number of workpieces W that are grasped by the fingers F1, F2 by using a learned model that has been learned by using the respective pressure distributions detected by the pressure distribution sensors 24-1, 24-2 as inputs and the number of workpieces W as the output, e.g., a learned model using a neural network.

After the control section 34 causes the robot mechanism 20 to perform the operation of grasping the workpiece W from the box 50, in a case in which the number of workpieces recognized by the recognition section 32 is different than a designated number that has been designated in advance, the control section 34 controls the movement of the robot mechanism 20 such that the number of grasped workpieces W becomes the designated number. Note that, in the present embodiment, description is given of a case in which the designated number is one. Namely, in a case in which the number of workpieces recognized by the recognition section 32 is a plural number, movement of the robot mechanism 20 is controlled such that the workpieces W are dropped until the number of workpieces recognized by the recognition section 32 becomes one.

Specifically, the control section 34 controls at least one of the driving sections 22-1, 22-2 such that at least one of the fingers F1, F2 moves in order to change the grasped state in which the workpieces W are grasped by the fingers F1, F2, for example. Namely, at least one of the fingers F1, F2 is shifted so that the relative position of the fingers F1, F2 changes. Due thereto, the grasped state of the workpieces W that are grasped by the fingers F1, F2 changes, and the workpieces W can be dropped.

The imaging section 40 is set at a position at which it can capture images of the workpieces W that are within the box 50, from above the box 50. The imaging section 40 outputs the captured image, in which the workpieces W within the box 50 are imaged, to the control device 30 due to an instruction of the control device 30.

Next is a block drawing illustrating hardware structures of the control device 30.

Figure 3:
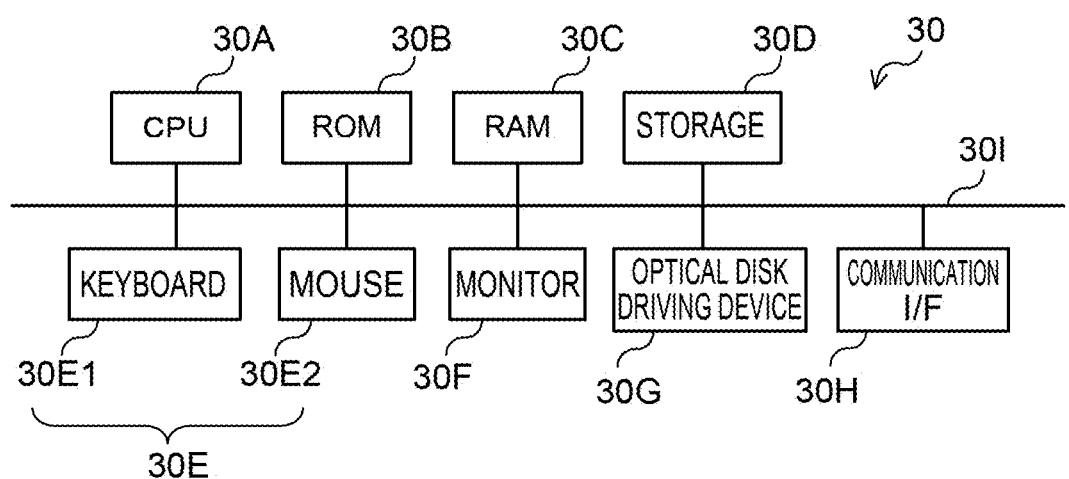
FIG. 3 is a block drawing illustrating hardware structures of the control device.

As illustrated in FIG. 3, the control device 30 has a CPU (Central Processing Unit) 30A, a ROM (Read Only Memory) 30B, a RAM (Random Access Memory) 30C, a storage 30D, an input section 30E, a monitor 30F, an optical disk drive device 30G, and a communication interface 30H. The respective structures are connected via bus 301 so as to be able to communicate with one another.

In the present embodiment, a picking program is stored in the storage 30D. The CPU 30A is a central computing processing unit, and executes various programs and controls respective structures. Namely, the CPU 30A reads-out a program from the storage 30D, and executes the program by using the RAM 30C as a workspace. The CPU 30A carries out control of the above-described respective structures, and various computing processings, in accordance with programs that are recorded in the storage 30D.

The ROM 30B stores various programs and various data. The RAM 30C temporarily stores programs or data as a workspace. The storage 30D is structured by an HDD (Hard Disk Drive) or an SSD (Solid State Drive), and stores various programs, including the operating system, and various data.

The input section 30E includes a keyboard 30E1 and a pointing device such as a mouse 30E2 or the like, and is used in order to carry out various types of input. The monitor 30F is a liquid crystal display for example, and displays various information such as the grasped state of the workpieces W and the like. The monitor 30F may be made to function as the input section 30E by using a touch panel type monitor therefor. The optical disk drive device 30G reads-in data stored on various recording media (a CD-ROM or a Blu-Ray disc or the like), and writes data to recording media, and the like.

The communication interface 30H is an interface for communicating with other equipment, and, for example, standards such as Ethernet®, FDDI, Wi-Fi® or the like are used thereat.

The respective functional structures of the control device 30 that are illustrated in FIG. 2 are realized due to the CPU 30A reading-out the picking program stored in the storage 30D, and expanding and executing the picking program in the RAM 30C.

Operation of the robot system 10 is described next.

Figure 4:
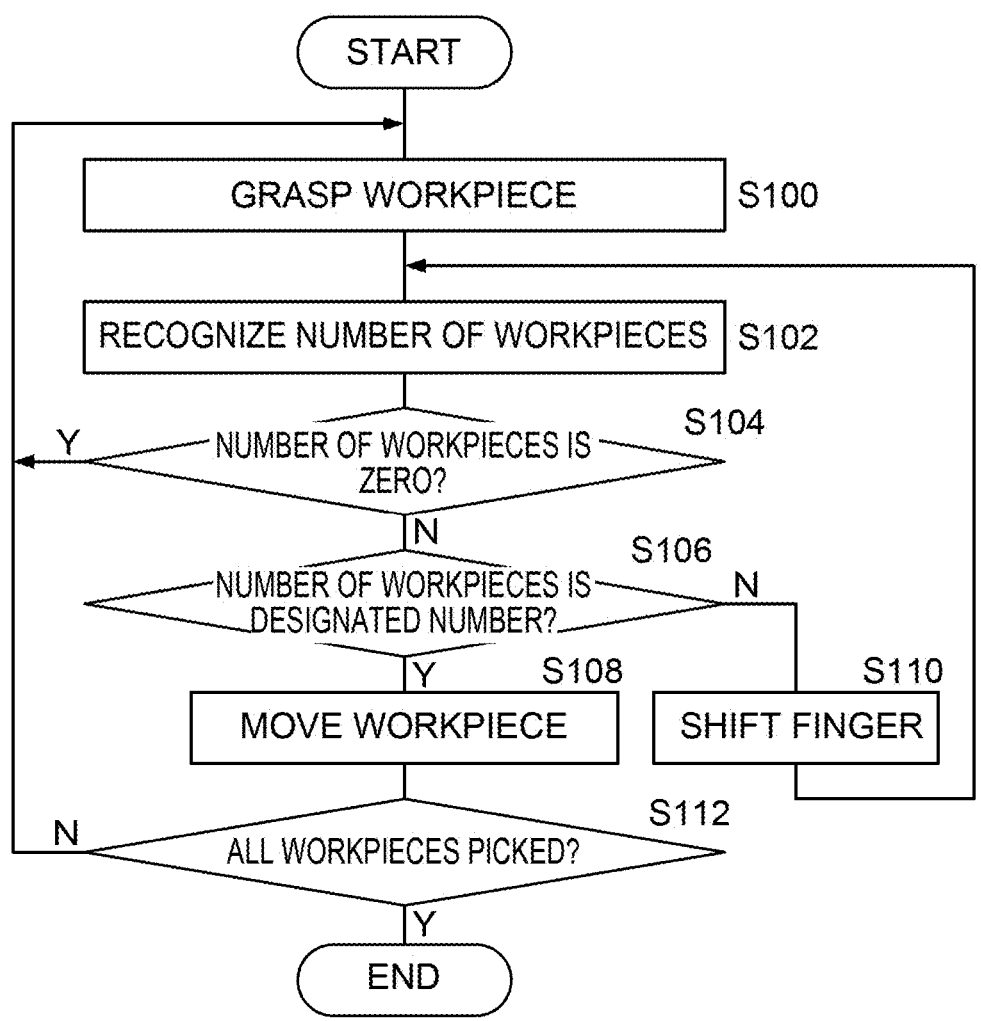
FIG. 4 is a flowchart illustrating the flow of picking processing.

FIG. 4 is a flowchart illustrating the flow of picking processing by the robot system 10. When a user operates the input section 30E and instructs execution of picking processing, the CPU 30A reads-out the picking program from the storage 30D and expands and executes the picking program in the RAM 30C, and picking processing is thereby executed.

In step S100, as the control section 34, the CPU 30A controls the robot mechanism 20 such that the workpieces W within the box 50 are grasped by the robot hand H. Specifically, for example, the CPU 30A specifies the place where the workpiece W exists by instructing the imaging section 40 to capture an image, acquiring a captured image in which the workpieces W within the box 50 are imaged, and subjecting the acquired captured image to image analysis. At this time, there is no need to specify the position and the posture of the workpiece W that is to be grasped, and it suffices to only specify the place where the workpiece W exists. Then, the CPU 30A controls the robot arm AR such that the robot hand H moves to the place where the workpiece W exists, and thereafter, controls the driving sections 22-1, 22-2 such that the workpiece W is grasped by the fingers F1, F2. Or, without carrying out imaging by the imaging section 40, the CPU 30A may carry out the operation of closing the fingers F1, F2 at any position within the box 50, and as a result thereof, the workpiece W may be grasped at a given probability. In particular, in a case in which a large number of the workpieces W remain within the box 50, the workpiece W can be grasped at a high probability even if the place where the workpiece W exists is not specified in advance.

In step S102, as the recognition section 32, the CPU 30A acquires the respective pressure distributions of the grasping surfaces of the fingers F1, F2 from the pressure distribution sensors 24-1, 24-2. Then, from the acquired pressure distributions of the grasping surfaces of the fingers F1, F2, the CPU 30A recognizes the number of workpieces W that are grasped by the fingers F1, F2.

In step S104, as the control section 34, the CPU 30A judges whether or not the number of workpieces W recognized in step S102 is zero. Then, if the recognized number of workpieces W is not zero, i.e., if at least one or more workpieces W are being grasped, the CPU 30A moves on to step S106. On the other hand, if the recognized number of workpieces is zero, the CPU 30A returns to step S100 and re-does grasping of the workpieces W.

In step S106, as the control section 34, the CPU 30A judges whether or not the number of workpieces W recognized in step S102 is the designated number, i.e., whether or not the number of recognized workpieces W is one. Then, if the number of recognized workpieces W is one, the CPU 30A moves on to step S108. On the other hand, if the number of recognized workpieces W is not one, i.e., is plural, the CPU 30A moves on to step S110.

In step S108, as the control section 34, the CPU 30A controls the robot mechanism 20 such that the workpiece W grasped by the robot hand H is moved to and placed at a predetermined place.

In step S110, as the control section 34, the CPU 30A controls at least one of the driving sections 22-1, 22-2 so as to shift at least one of the fingers F1, F2. For example, the CPU 30A may determine the finger to be shifted, the direction and the amount of movement in advance, or the CPU 30A may determine the finger to be shifted, the direction and the amount of movement on the basis of the pressure distributions of the grasping surfaces of the fingers F1, F2 acquired in step S102. Due thereto, the grasped state of the workpiece W that is grasped by the fingers F1, F2 changes, and it is easy for the workpiece W to drop down.

In step S112, as the control section 34, the CPU 30A judges whether or not all of the workpieces W within the box 50 have been picked. Namely, the CPU 30A judges whether or not the interior of the box 50 is empty. Specifically, for example, the CPU 30A carries out image analysis on the captured image that was captured by the imaging section 40, and judges whether or not the workpieces W remain in the box 50. Then, if no workpieces W remain within the box 50, the CPU 30A ends the present routine. On the other hand, if the workpieces W do remain within the box 50, the CPU 30A returns to step S100, and repeats processings similar to those described above until all of the workpieces W have been picked.

In this way, in the present embodiment, it is not the case that the workpiece W is grasped after the position and the posture of the workpiece W that is to be grasped are detected in advance. Firstly, the workpiece W is grasped, and thereafter, movement that shifts at least one of the fingers F1, F2 until the number of grasped workpieces W becomes the designated number is carried out. Due thereto, even if the position and the posture of the workpiece W are not detected in advance each time, the workpiece W can be picked with high accuracy.

Modified Example 1

Modified Example 1 of the first embodiment is described next.

When recognizing the number of grasped workpieces W, the number of grasped workpieces W may be recognized on the basis of the contact surface areas of the workpieces W at the respective grasping surfaces of the fingers F1, F2. For example, the contact surface areas of the workpieces W at the respective grasping surfaces of the fingers F1, F2 are respectively computed on the basis of the respective pressure distributions detected at the pressure distribution sensors 24-1, 24-2. Then, the number of workpieces W that are grasped may be recognized by using, for example, table data or a formula or the like that expresses the relationships of correspondence between the respective contact surface areas and the number of grasped workpieces. For example, in a case in which the workpieces W are spherical, the contact surface area that is formed due to the grasping surface that is elastic being pushed by one workpiece W is relatively stable, and therefore, the number can be recognized in this way.

Modified Example 2

Modified Example 2 of the first embodiment is described next.

When recognizing the number of grasped workpieces W, for example, the state in which the workpieces W are grasped by the fingers F1, F2 may be imaged by the imaging section 40 that serves as an example of the detecting section, and the number of grasped workpieces W may be recognized on the basis of the captured image that is captured by the imaging section 40. In this case, the control section 34 may move the robot hand H such that the workpieces W grasped by the fingers F1, F2 are imaged at a position at which they can be captured by the imaging section 40, i.e., at a position at which the workpieces W are not hidden by the fingers F1, F2. Or, there may be a structure that further has a mechanism for moving the imaging section 40, and the imaging section 40 may be moved to the position of the robot hand H. Or, both the robot hand H and the imaging section 40 may be moved.

Modified Example 3

Modified Example 3 of the first embodiment is described next.

When recognizing the number of grasped workpieces W, for example, there may be a structure having a six-axis force sensor that serves as an example of the detecting section that detects the forces applied to the fingers F1, F2 in the state in which the workpieces W are grasped by the fingers F1, F2, and the recognition section 32 may recognize the number of workpieces W on the basis of amount by which the vertical direction component of the forces detected by the force sensor increases after grasping as compared with before grasping, i.e., the total weight of the workpieces W. In this case, for example the number of workpieces W may be recognized on the basis of the total weight of the workpieces W and the weight per workpiece W. Namely, the number of workpieces W is computed by dividing the total weight of the workpieces W, which is computed from the force detected by the force sensor, by the weight per workpiece W.

Modified Example 4

Modified Example 4 of the first embodiment is described next.

In a case in which the number of workpieces W recognized by the recognition section 32 is different than the designated number, e.g., is less than the designated number, the control section 34 may control the movement of the robot mechanism 20 so as to re-do the grasping of the workpieces W from the box 50. Namely, by operating the fingers F1, F2 to open above the box 50, the robot mechanism 20 may be controlled so as to, after returning the once-grasped workpieces W above the box 50, again grasp the workpieces W within the box 50.

Modified Example 5

Modified Example 5 of the first embodiment is described next.

In a case in which the number of workpieces W recognized by the recognition section 32 is greater than the designated number, the control section 34 may control the robot mechanism 20 so as to apply external force to at least some of the workpieces grasped by the fingers F1, F2, and cause them to fall. For example, the control section 34 may control the robot mechanism 20 such that the workpieces W are made to collide with a fixed, rod-shaped jig, and cause the workpieces W to fall. Further, there may be a structure that is further provided with an external force mechanism that applies external force to the workpieces W by a rod-shaped member for example, and the control section 34 may cause the workpieces W to fall by controlling the external force mechanism and causing the rod-shaped member to collide with the workpieces W.

Second Embodiment

A second embodiment is described next. Note that portions that are the same as the first embodiment are denoted by the same reference numerals, and detailed description thereof is omitted.

The second embodiment describes the case of a structure in which at least one of the fingers F1, F2 is flexible. The second embodiment describes a case in which both of the fingers F1, F2 are flexible, but there may be a structure in which one of the fingers F1, F2 is flexible.

Figure 5:
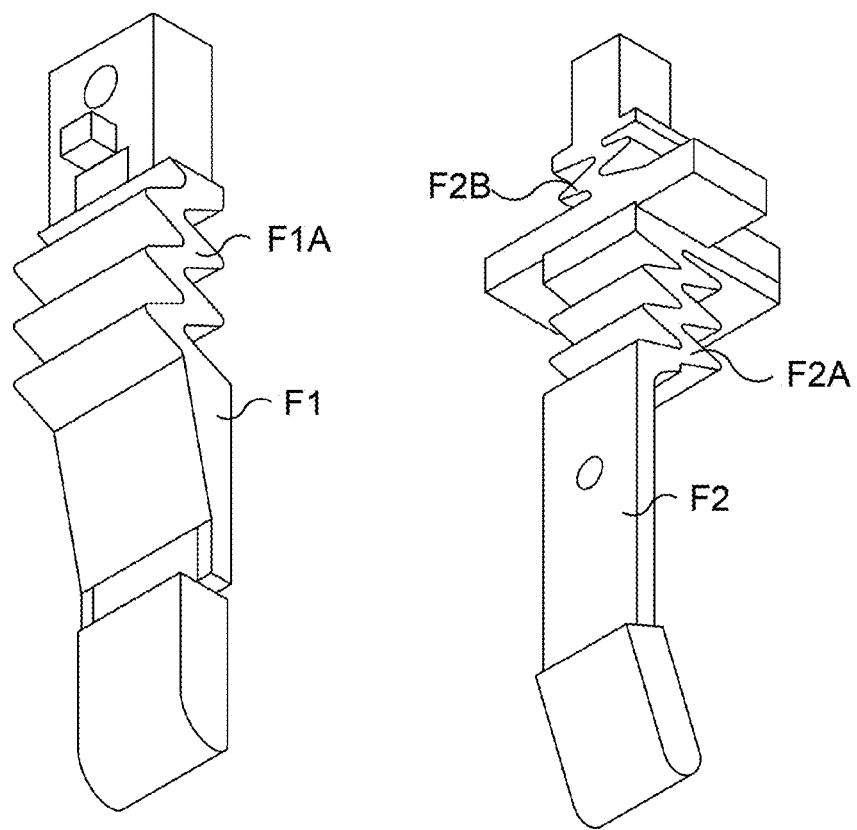
FIG. 5 is a perspective view of fingers.

As illustrated in FIG. 5, the finger F1 relating to the second embodiment has bellows F1A that is flexible in the X-axis direction, in a case in which the longitudinal direction of the finger F1 is the Z-axis direction, i.e., runs along the gravitational direction. Therefore, the finger F1 is flexible in the X-axis direction in FIG. 5.

Further, the finger F2 has bellows F2A that is flexible in the X-axis direction. Therefore, the finger F1 is flexible in the X-axis direction in FIG. 5. Moreover, the finger F2 has bellows F2B that is flexible in the Y-axis direction. Therefore, the finger F2 is flexible also in the Y-axis direction in FIG. 5.

Figure 6A:
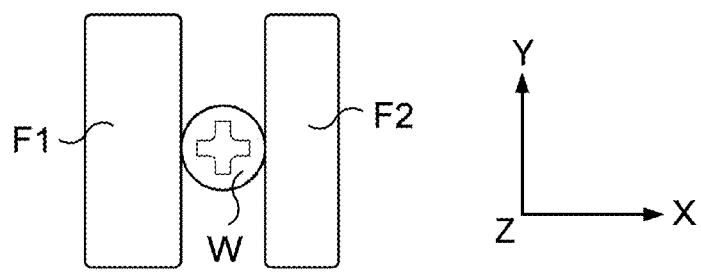
FIG. 6 is a view in which the fingers that are grasping a workpiece are seen from below along the Z-axis direction.
Figure 6B:
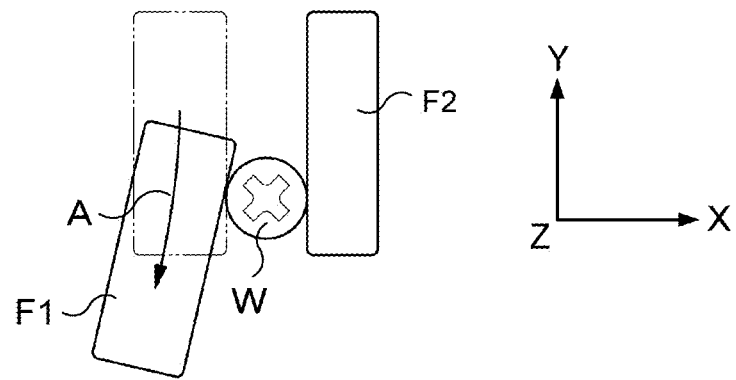

The driving section 22-1 has a motor for rotation that is driven such that the finger F1 rotates in the arrow A direction with the Z-axis direction being the rotational axis in FIG. 5. Due to this motor for rotation being driven, the finger F1 can be shifted from the state of grasping the workpiece W when the fingers F1, F2 are viewed from below as illustrated in FIG. 6(A), in the arrow A direction with the Z-axis direction being the rotational axis as illustrated in FIG. 6(B).

Figure 7A:
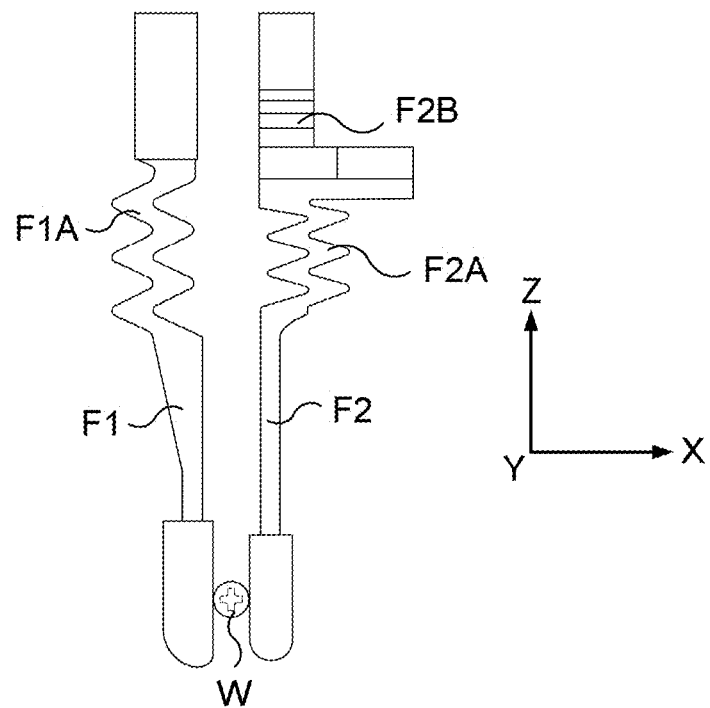
FIG. 7 is a view in which the fingers that are grasping the workpiece are seen along the Y-axis direction.
Figure 7B:
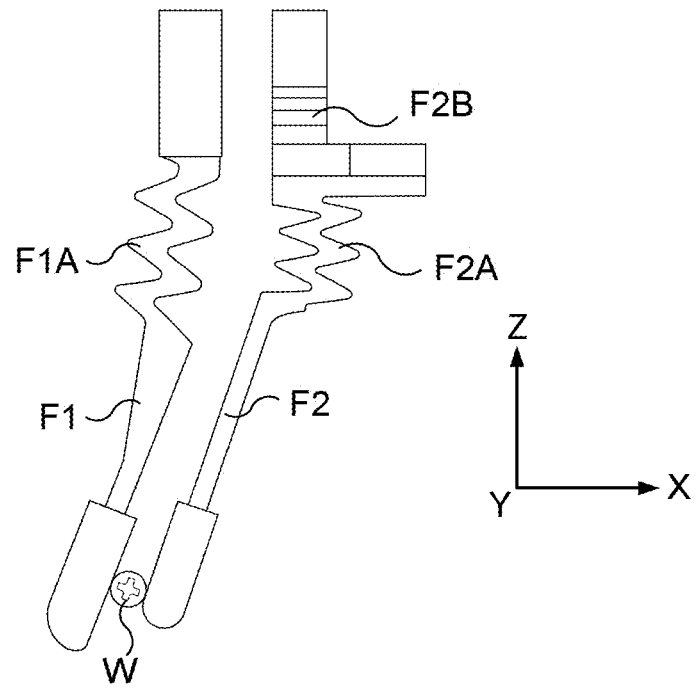

Further, the fingertip of the finger F2 and the driving section 22-2 are connected by, for example, a first tendon (not illustrated) that is string-shaped. Further, the driving section 22-2 has a first motor for pulling that is driven so as to pull the first tendon. Due to this first motor for pulling being driven, the finger F2 can be moved from the state illustrated in FIG. 7(A) in the X-axis direction as illustrated in FIG. 7(B). Note that, because the finger F1 has the bellows F1A that is flexible in the X-axis direction, the finger F1 moves in the X-axis direction following the movement of the finger F2.

Figure 8A:
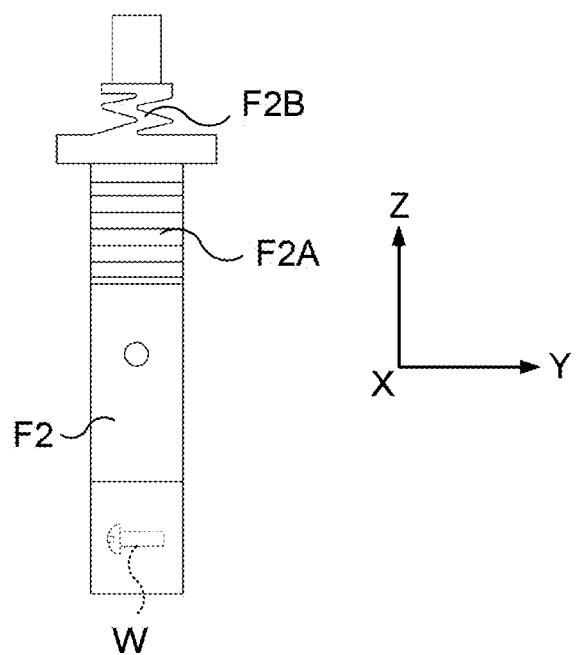
FIG. 8 is a view in which the fingers that are grasping the workpiece are seen along the X-axis direction.
Figure 8B:
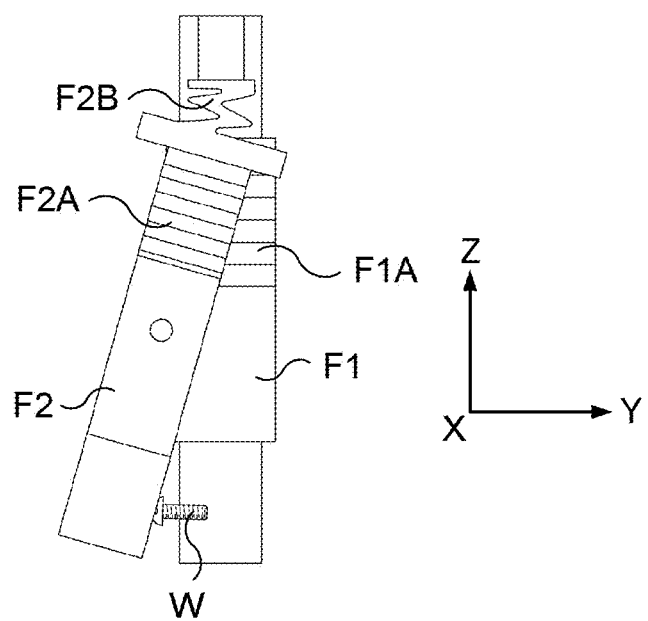

Further, the fingertip of the finger F2 and the driving section 22-2 are connected by, for example, a second tendon (not illustrated) that is string-shaped. Further, the driving section 22-2 has a second motor for pulling that is driven so as to pull the second tendon. Due to this second motor for pulling being driven, the finger F2 can be moved from the state illustrated in FIG. 8(A) in the Y-axis direction as illustrated in FIG. 8(B). Note that, because the finger F1 is not flexible in the Y-axis direction, the finger F1 does not move in the Y-axis direction following the movement of the finger F2.

Figure 9:
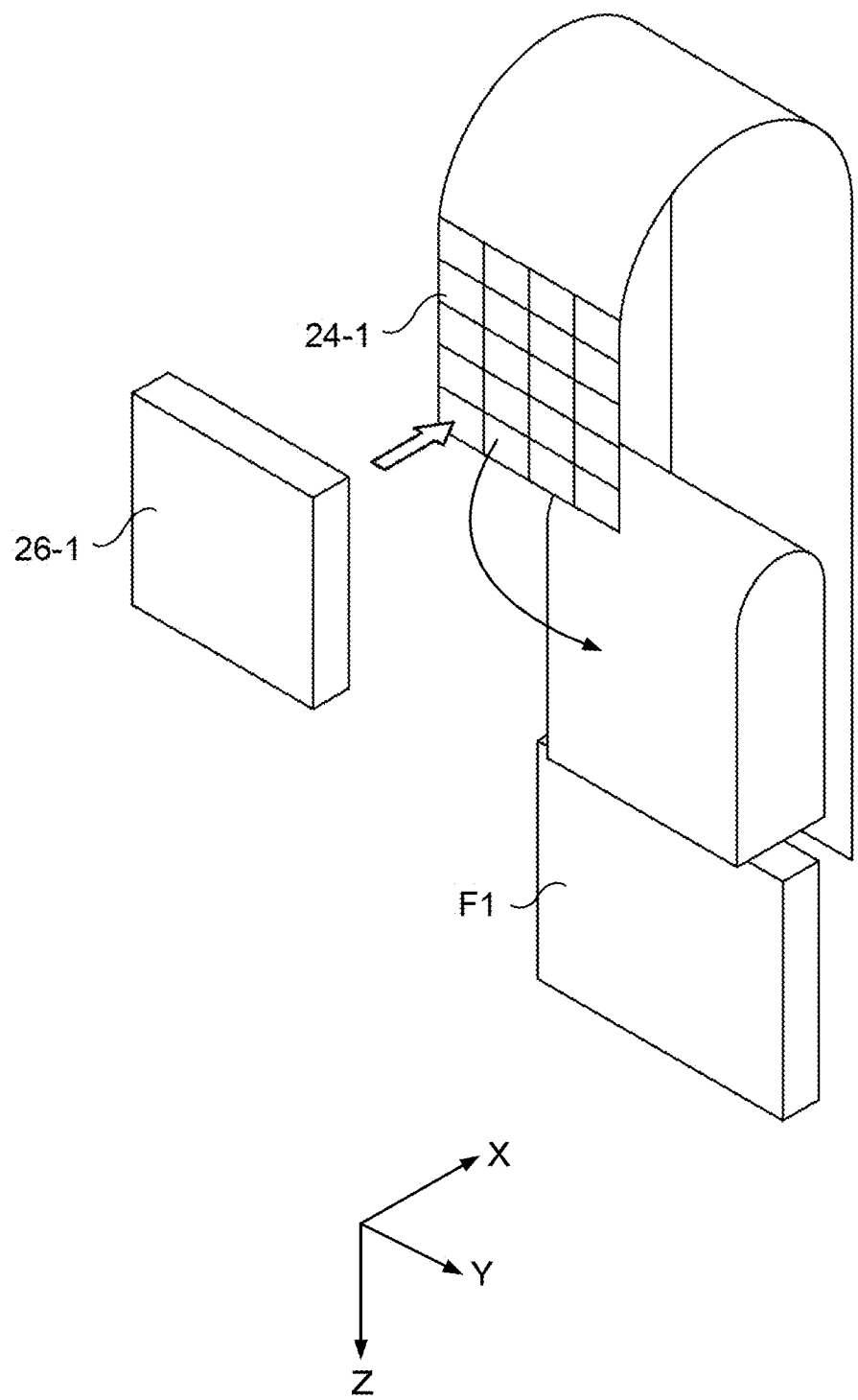
FIG. 9 is a drawing illustrating a pressure distribution sensor and an elastic member.

Further, although not illustrated in FIG. 1, as illustrated in FIG. 9, the pressure distribution sensor 24-1 is affixed to the workpiece W grasping surface of the fingertip of the finger F1, and an elastic member 26-1 is further affixed from thereon. Similarly, at the finger F2 as well, the pressure distribution sensor 24-2 is affixed to the workpiece W grasping surface of the fingertip, and an elastic member that is similar to the elastic member 26-1 is further affixed from thereon.

The pressure distribution sensors 24-1, 24-2 are structured by m x n (m and n are integers) pressure detecting elements. For example, it can be made such that m=6 and n=4, or the like, but the values of m and n are not limited to these.

Figure 10A:
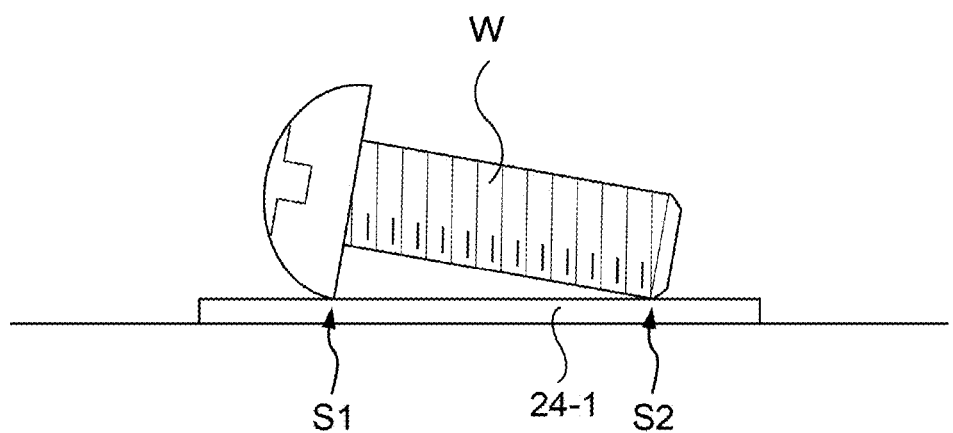
FIG. 10 is a drawing for explaining the elastic member.
Figure 10B:
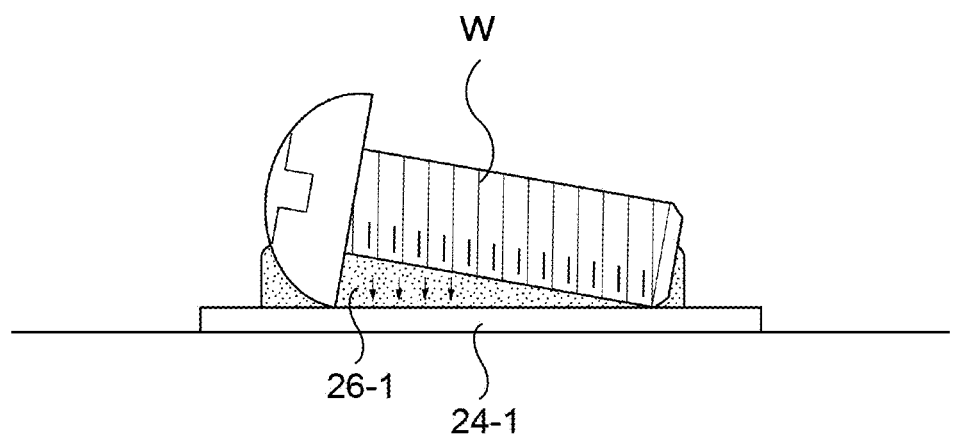

For example, as illustrated in FIG. 10(A), in a case in which the elastic member 26-1 is not provided on the pressure distribution sensor 24-1, at the time when the workpiece W is grasped, the workpiece W can only be sensed at contact points S1, S2 that are at two places, and therefore, there is the concern that the workpiece W will not be able to be recognized accurately. In contrast, as illustrated in FIG. 10(B), in the case of the structure in which the elastic member 26-1 is provided on the pressure distribution sensor 24-1, the pressure of the workpiece W that is grasped is transferred in a plane to the pressure distribution sensor 24-1 as illustrated by the arrows in FIG. 10(B), and the workpiece W can be recognized accurately.

Note that the fingers F1, F2 may be structured by elastic members. Namely, elastic members are not provided separately, and the fingertips themselves of the fingers F1, F2 may be structured by elastic members.

In the second embodiment, as an example, the recognition section 32 recognizes the number of workpieces W by a grasped number recognition model that is learned by using the pressure distributions detected by the pressure distribution sensors 24-1, 24-2 as inputs, and the number of workpieces W grasped by the fingers F1, F2 as the output.

A learned model that has learned a learning model that uses a convolutional neural network (CNN) for example can be used as the grasped number recognition model, but is not limited to this.

The pressure distribution detection for recognizing the number of workpieces W may be carried out plural times by changing the relative positional relationship of the fingers F1, F2. In this case, at the control section 34, by carrying out control that moves at least one of the fingers F1, F2 in a predetermined direction, the grasped state of the workpieces W can be detected plural times at the pressure distribution sensors 24-1, 24-2. For example, the pressure distributions can be detected plural times at the pressure distribution sensors 24-1, 24-2 while moving the finger F2 in the X-axis direction so as to push the finger F1. Namely, the pressure distributions of the grasping surfaces of the fingers F1, F2 are detected in time series.

The recognition section 32 inputs the results of detection of plural times at the respective pressure distribution sensors 24-1, 24-2, i.e., the respective pressure distributions of the fingers F1, F2 that are detected plural times, to the grasped number recognition model. In this way, the number of workpieces W can be recognized accurately by inputting plural pressure distributions to the grasped number recognition model.

Note that, for example, a stretch sensor that detects the extent of warping of the finger F1 in the X-axis direction may be provided at the finger F1, and the output value of this stretch sensor may be further inputted to the grasped number recognition model.

In the state in which the workpieces W are grasped by the fingers F1, F2, the control section 34 controls movement of the robot mechanism 20 such that the position of at least one finger among the fingers F1, F2 changes.

Specifically, in the state in which the workpieces W are grasped by the fingers F1, F2, the control section 34 controls movement of the robot mechanism 20 such that at least one of the fingers F1, F2 is moved in at least one of a first direction that is determined in advance, a second direction that intersects the first direction, a third direction that intersects the first direction and the second direction, and a rotation direction of rotating with the third direction as the rotational axis. For example, in a case in which the X-axis direction in FIG. 5 is the first direction, the Y-axis direction is the second direction, the Z-axis direction is the third direction, and the arrow A direction is the rotation direction.

The finger that is to be shifted, the direction and the amount of movement may be determined on the basis of, for example, the pressure distributions of the grasping surfaces of the fingers F1, F2 that are acquired in step S102, as described in the first embodiment.

Further, the control section 34 may control movement of the robot mechanism 20 on the basis of a driving method outputted from a driving method model that is learned by using, as inputs, the pressure distributions detected by the pressure distribution sensors 24-1, 24-2 and the driving states of the driving sections 22-1, 22-2, and, as outputs, the number of workpieces W grasped by the fingers F1, F2 and the driving methods of the driving sections 22-1, 22-2 for making the number of workpieces W be the designated number. What is called "driving method" here is information relating to driving such as, for example, a driving command or information that is the basis of generation of a driving command, and means that which corresponds to what is called "behavior" in machine learning and what is called "control input" in control theory. In the second embodiment, description is given of a case in which the movement of the robot mechanism 20 is controlled on the basis of a driving method outputted from a driving method model.

Here, the driving state of the driving section 22-1 is the rotational angle of the motor for rotation of the driving section 22-1, and corresponds to the amount of movement of the finger F1 in the arrow A direction from the initial state. Further, the driving states of the driving section 22-2 are the rotational angle of the first motor for pulling and the rotational angle of the second motor for pulling of the driving section 22-2, and correspond to the amount of movement of the finger F2 in the X-axis direction from the initial state and the amount of movement of the finger F2 in the Y-axis direction from the initial state, respectively.

In the second embodiment, as an example, the driving method model is structured by using a learned model that includes an LSTM (Long Short-Term Memory) based learning model that is one type of a recurrent neural network (RNN), and/or a reinforcement learning model.

In this driving method model, the pressure distributions detected at the pressure distribution sensors 24-1, 24-2 and the driving states of the driving sections 22-1, 22-2 are inputted to an LSTM based learning model, and the number of workpieces W that are grasped is determined. Then, the determined number of workpieces W, the pressure distributions detected at the pressure distribution sensors 24-1, 24-2, and the driving states of the driving sections 22-1, 22-2 are inputted to a reinforcement learning model as state information. The reinforcement learning model outputs driving methods of the driving sections 22-1, 22-2 as behaviors corresponding to the inputted state information. Namely, the rotational angle of the motor for rotation of the driving section 22-1, the rotational angle of the first motor for pulling of the driving section 22-2, and the rotational angle of the second motor for pulling of the driving section 22-2 are outputted. In accordance with the driving methods outputted from the driving method model, the control section 34 drives the driving sections 22-1, 22-2, and moves at least one of the fingers F1, F2. Note that the output value of the stretch sensor may be included in the state information, and may be further inputted to the driving method model.

Operation of the robot system 10 is described next.

The basic flow of the picking processing by the robot system 10 relating to the second embodiment is similar to the processing shown in the flowchart illustrated in FIG. 4 that was described in the first embodiment. The characteristic processings in the second embodiment are described hereinafter.

In step S102 of FIG. 4, the CPU 30A as the recognition section 32 acquires the respective pressure distributions of the grasping surfaces of the fingers F1, F2 in time series from the pressure distribution sensors 24-1, 24-2, while, as the control section 34, moving the finger F2 in the X-axis direction in the state in which the workpieces W are grasped by the fingers F1, F2. Then, by inputting the pressure distributions of the grasped surfaces of the fingers F1, F2 that were acquired in time series to the grasped number recognition model, the CPU 30A recognizes the number of workpieces W grasped by the fingers F1, F2.

In step S110, as the control section 34, the CPU 30A inputs the pressure distributions detected at the pressure distribution sensors 24-1, 24-2 and the driving states of the driving sections 22-1, 22-2 to the driving method model, and by driving the driving sections 22-1, 22-2 in accordance with the driving methods outputted from the driving method model, moves at least one of the fingers F1, F2 so as to shift the at least one of the fingers F1, F2, and changes the grasped state of the workpieces W. Due thereto, it is easy for the workpiece W to drop down.

In this way, in the second embodiment, the grasped number of workpieces W is recognized by using the grasped number recognition model, and operations of the fingers F1, F2 are controlled by using the driving method model. Due thereto, the workpiece W can be picked with high accuracy even if the position and the posture of the workpiece W are not detected in advance each time.

Note that any of various types of processors other than a CPU may execute the picking processing that is executed due to the CPU reading-in software (a program) in the above-described respective embodiments. Examples of processors in this case include PLDs (Programmable Logic Devices) whose circuit structure can be changed after production such as FPGAs (Field-Programmable Gate Arrays) and the like, and dedicated electrical circuits that are processors having circuit structures that are designed for the sole purpose of executing specific processings such as ASICs (Application Specific Integrated Circuits) and the like, and the like. Further, the picking processing may be executed by one of these various types of processors, or may be executed by a combination of two or more of the same type or different types of processors (e.g., plural FPGAs, or a combination of a CPU and an FPGA, or the like). Further, the hardware structures of these various types of processors are, more specifically, electrical circuits that combine circuit elements such as semiconductor elements and the like.

Further, the above embodiments describe a form in which the picking program is stored in advance (is installed) in the storage 30D or the ROM 30B, but the present disclosure is not limited to this. The program may be provided in a form of being recorded on a recording medium such as a CD-ROM (Compact Disk Read Only Memory, a DVD-ROM (Digital Versatile Disk Read Only Memory), a USB (Universal Serial Bus) memory, or the like. Further, the program may be in a form of being downloaded from an external device over a network.

Note that the disclosure of Japanese Patent Application No. 2020-151539 is, in its entirety, incorporated by reference into the present specification. Further, all publications, patent applications, and technical standards mentioned in the present specification are incorporated by reference into the present specification to the same extent as if such individual publication, patent application, or technical standard was specifically and individually indicated to be incorporated by reference.

EXPLANATION OF REFERENCE NUMERALS 10 robot system
20 robot mechanism
22-1, 22-2 driving section
24-1, 24-2 pressure distribution sensor
26-1 elastic member
30 control device
32 recognition section
34 control section
40 imaging section
50 box
F1, F2 finger
F1A, F2A, F2B bellows
AR robot arm
H robot hand
W workpiece

The invention claimed is:

1. A robot system comprising:
a robot mechanism that has a plurality of fingers that grasp a workpiece;
a sensor that detects a grasped state of the workpiece by the plurality of fingers;
a control device including a processor:
that recognizes a number of workpieces grasped by the plurality of fingers, based on detection results of the sensor; and
that, after causing the robot mechanism to perform an operation of grasping the workpiece from a placement place at which a plurality of the workpieces are placed, in a case in which the number of workpieces recognized by the control device differs from a designated number that is designated in advance, controls movement of the robot mechanism such that the number of workpieces that are grasped becomes the designated number, wherein:
at least one finger of the plurality of fingers is flexible, and
in a state in which the workpiece is grasped by the plurality of fingers, the control device controls the movement of the robot mechanism such that a position of at least one finger changes,
wherein the control device controls the movement of the robot mechanism so as to, in a state in which the workpiece is grasped by the plurality of fingers, repeat moving of at least one finger of the plurality of fingers in at least one direction among a first direction that is a direction of movement for grasping, a second direction that intersects the first direction and a longitudinal direction of the fingers, a third direction that is the longitudinal direction of the fingers, or a rotation direction of rotating with the third direction being a rotation axis, until the number of workpieces recognized by the control device becomes the designated number, and
wherein when at least one finger of the plurality of fingers is moved in the first direction, other fingers of the plurality of fingers that are not the at least one finger of the plurality of fingers move in the first direction following movement of the at least one finger of the plurality of fingers, and when the at least one finger of the plurality of fingers is moved in the second direction, the other fingers do not move in the second direction following the movement of the at least one finger of the plurality of fingers.

2. The robot system of claim 1, wherein at least one finger of the plurality of fingers is structured by an elastic member.

3. A robot system comprising:
a robot mechanism that has a plurality of fingers that grasp a workpiece;
a sensor that detects a grasped state of the workpiece by the plurality of fingers;
a control device including a processor:
that recognizes a number of workpieces grasped by the plurality of fingers, based on detection results of the sensor; and
that, after causing the robot mechanism to perform an operation of grasping the workpiece from a placement place at which a plurality of the workpieces are placed, in a case in which the number of workpieces recognized by the control device differs from a designated number that is designated in advance, controls movement of the robot mechanism such that the number of workpieces that are grasped becomes the designated number,
wherein the sensor includes a pressure distribution sensor that is provided at a grasping surface of at least one finger and that detects a pressure distribution of the grasping surface that the workpiece contacts,
wherein the control device recognizes the number of workpieces by a grasped number recognition model that is learned by using, as an input, the pressure distribution detected by the sensor, and, as an output, the number of workpieces grasped by the plurality of fingers,
wherein the control device controls the movement of the robot mechanism based on a driving method outputted from a driving method model that is learned by using, as inputs, the pressure distribution and a driving state of a driving section that drives the plurality of fingers, and, as outputs, the number of workpieces grasped by the plurality of fingers and the driving method of the driving section for making the number of workpieces be the designated number,
wherein the control device controls the movement of the robot mechanism so as to, in a state in which the workpiece is grasped by the plurality of fingers, repeat moving of at least one finger of the plurality of fingers in at least one direction among a first direction that is a direction of movement for grasping, a second direction that intersects the first direction and a longitudinal direction of the finger, a third direction that is the longitudinal direction of the finger, or a rotation direction of rotating with the third direction being a rotation axis, until the number of workpieces recognized by the control device becomes the designated number, and
wherein when at least one finger of the plurality of fingers is moved in the first direction, other fingers of the plurality of fingers that are not the at least one finger of the plurality of fingers move in the first direction following movement of the at least one finger of the plurality of fingers, and when the at least one finger of the plurality of fingers is moved in the second direction, the other fingers do not move in the second direction following the movement of the at least one finger of the plurality of fingers.

4. The robot system of claim 3, wherein an elastic member is provided on the pressure distribution sensor.

5. The robot system of claim 1, wherein:
the sensor detects the grasped state plural times in states in which relative positional relationships between the plurality of fingers differ from one another, and
the control device recognizes the number of workpieces based on results of detection of the grasped state of the plural times.

6. A picking method comprising:
detecting a grasped state of a workpiece by a plurality of fingers of a robot mechanism that has the plurality of fingers that grasp a workpiece;
recognizing a number of workpieces grasped by the plurality of fingers, based on detection results of the grasped state of the workpiece; and
after causing the robot mechanism to perform an operation of grasping the workpiece from a placement place at which a plurality of the workpieces are placed, in a case in which the number of workpieces that has been recognized differs from a designated number that is designated in advance, controlling movement of the robot mechanism such that the number of workpieces that are grasped becomes the designated number,
wherein at least one finger of the plurality of fingers is flexible,
wherein in a state in which the workpiece is grasped by the plurality of fingers, the movement of the robot mechanism is controlled such that a position of at least one finger changes,
wherein the control device controls the movement of the robot mechanism so as to, in a state in which the workpiece is grasped by the plurality of fingers, repeat moving of at least one finger of the plurality of fingers in at least one direction among a first direction that is a direction of movement for grasping, a second direction that intersects the first direction and a longitudinal direction of the fingers, a third direction that is the longitudinal direction of the fingers, or a rotation direction of rotating with the third direction being a rotation axis, until the number of workpieces recognized by the control device becomes the designated number, and
wherein when at least one finger of the plurality of fingers is moved in the first direction, other fingers of the plurality of fingers that are not the at least one finger of the plurality of fingers move in the first direction following movement of the at least one finger of the plurality of fingers, and when the at least one finger of the plurality of fingers is moved in the second direction, the other fingers do not move in the second direction following the movement of the at least one finger of the plurality of fingers.

7. A picking method comprising:
detecting a grasped state of a workpiece by a plurality of fingers of a robot mechanism that has the plurality of fingers that grasp the workpiece;
recognizing a number of workpieces grasped by the plurality of fingers, based on detection results of the grasped state of the workpiece; and
after causing the robot mechanism to perform an operation of grasping the workpiece from a placement place at which a plurality of the workpieces are placed, in a case in which the number of workpieces that has been recognized differs from a designated number that is designated in advance, controlling movement of the robot mechanism such that the number of workpieces that are grasped becomes the designated number,
wherein a pressure distribution sensor, which is provided at a grasping surface of at least one finger and detects a pressure distribution of the grasping surface that the workpiece contacts, is included,
wherein the number of workpieces is recognized by a grasped number recognition model that is learned by using, as an input, the detected pressure distribution, and, as an output, the number of workpieces grasped by the plurality of fingers, and
wherein the movement of the robot mechanism is controlled based on a driving method outputted from a driving method model that is learned by using, as an input, the pressure distribution, and, as outputs, the number of workpieces grasped by the plurality of fingers and the driving method of at least one finger of the plurality of fingers, the driving method being for making the number of workpieces be the designated number,
wherein the control device controls the movement of the robot mechanism so as to, in a state in which the workpiece is grasped by the plurality of fingers, repeat moving of at least one of the plurality of fingers in at least one direction among a first direction that is a direction of movement for grasping, a second direction that intersects the first direction and a longitudinal direction of the fingers, a third direction that is the longitudinal direction of the fingers, or a rotation direction of rotating with the third direction being a rotation axis, until the number of workpieces recognized by the control device becomes the designated number, and
wherein when at least one finger of the plurality of fingers is moved in the first direction, other fingers of the plurality of fingers that are not the at least one finger of the plurality of fingers move in the first direction following movement of the at least one finger of the plurality of fingers, and when the at least one finger of the plurality of fingers is moved in the second direction, the other fingers do not move in the second direction following the movement of the at least one finger of the plurality of fingers.

8. The robot system of claim 1,
wherein the robot mechanism further includes a driving section that drives the plurality of fingers,
wherein each finger of the plurality of fingers include a first end portion and a second end portion,
wherein the first end portion is coupled to the driving section by at least one bellows; and
wherein the second end portion is a free end.

9. The robot system of claim 8,
Wherein the at least one finger of the plurality of fingers includes a larger number of bellows than the other fingers, and
wherein at least one of bellows in the at least one finger is disposed in a different direction from bellows in the at least one remaining finger.

10. The robot system of claim 9,
wherein the at least one finger includes:
a first bellows connected to the first end portion of the at least one finger and disposed in the first direction to allow the at least one finger to be flexible in the first direction; and a second bellows connected to the first bellows in series and disposed in the second direction to allow the at least one finger to be flexible in the second direction, and wherein the other fingers include a third bellows disposed in the first direction to allow the other fingers to be flexible in the first direction.

11. The robot system of claim 8,
wherein the sensor includes a pressure distribution sensor that is disposed at a grasping surface of the free end and that detects a pressure distribution of the grasping surface that the workpiece contacts, and wherein an elastic member is disposed on a surface of the pressure distribution sensor.

12. The robot system of claim 3,
wherein each finger of the plurality of fingers include a first end portion and a second end portion, wherein the first end portion is coupled to the driving section by at least one bellows; and wherein the second end portion is a free end.

13. The robot system of claim 12,
wherein the at least one finger of the plurality of fingers includes a larger number of bellows than the other fingers, and wherein at least one of bellows in the at least one finger is disposed in a different direction from bellows in the other fingers.

14. The robot system of claim 13,
wherein the at least one finger includes:
   a first bellows connected to the first end portion of the at least one finger and disposed in the first direction to allow the at least one finger to be flexible in the first direction; and
   a second bellows connected to the first bellows in series and disposed in the second direction to allow the at least one finger to be flexible in the second direction, and wherein the other fingers includes a third bellows disposed in the first direction to allow the other fingers to be flexible in the first direction.

* * * * *